W. S. BAIRD.
CORN HARVESTING MACHINE.
APPLICATION FILED OCT. 27, 1910.
1,042,371.
Patented Oct. 22, 1912.
3 SHEETS—SHEET 1.
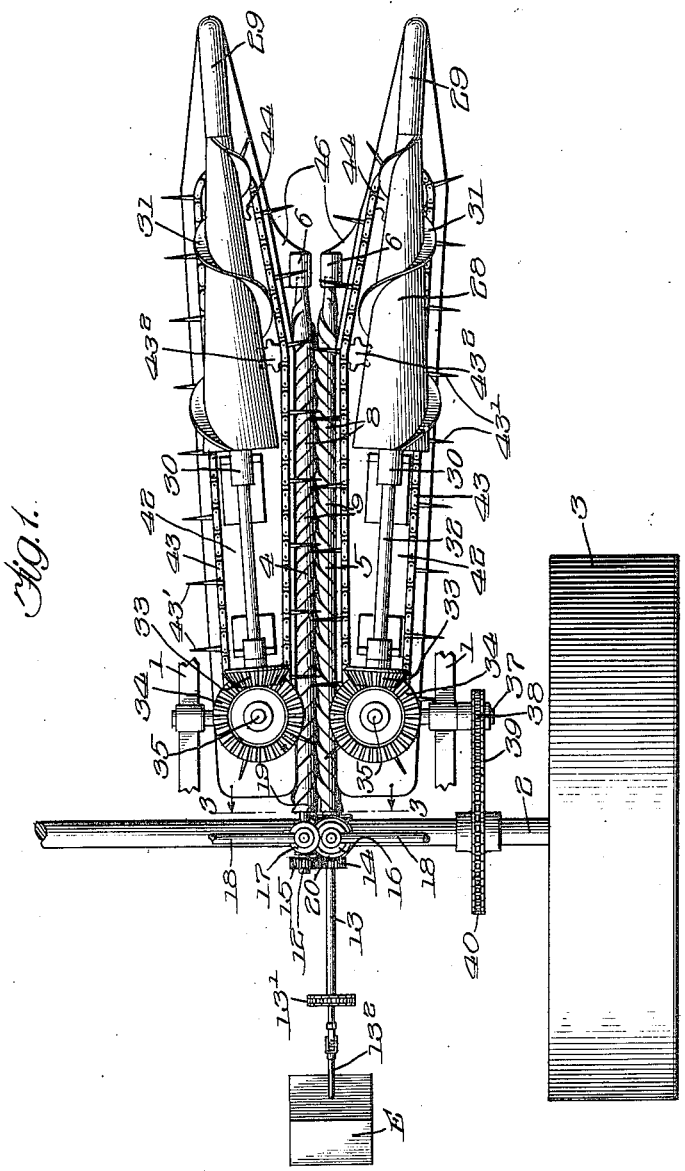

W. S. BAIRD.
CORN HARVESTING MACHINE.
APPLICATION FILED OCT. 27, 1910.
1,042,371.
Patented Oct. 22, 1912.
3 SHEETS—SHEET 2.
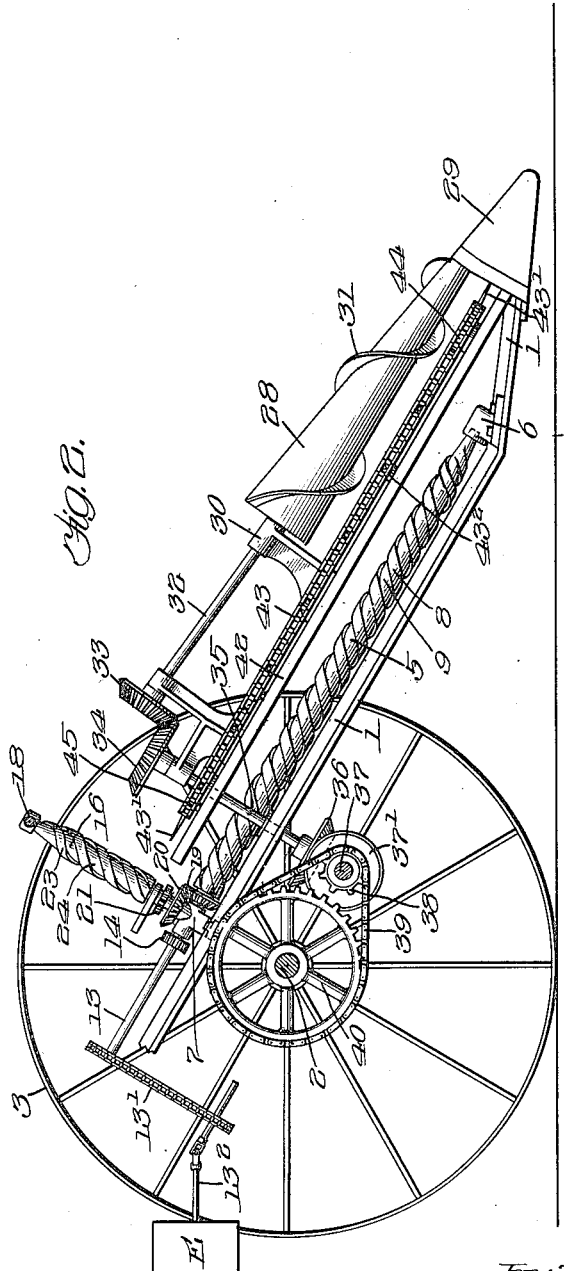

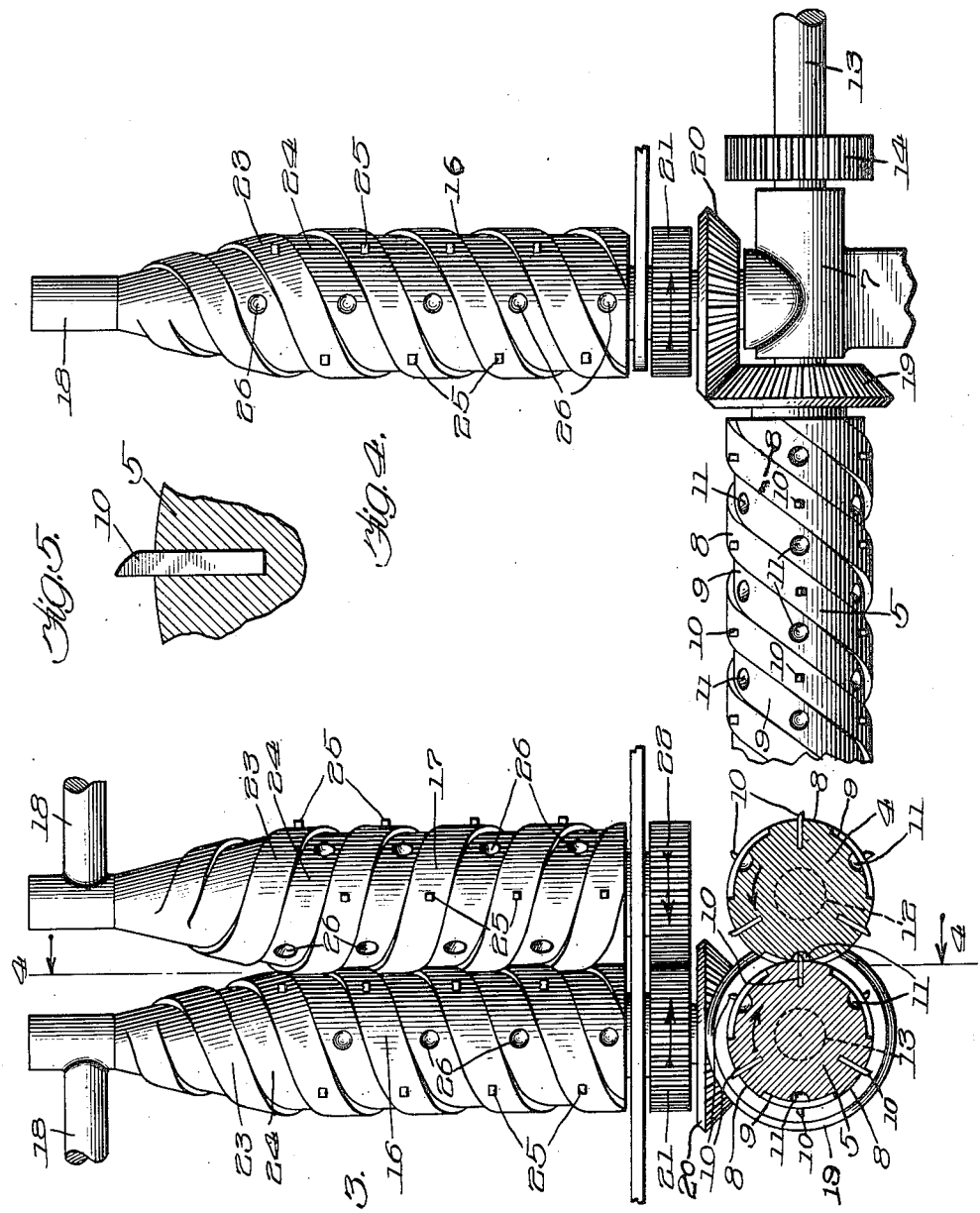

UNITED STATES PATENT OFFICE.

WILLIAM SEWARD BAIRD, OF URBANA, ILLINOIS, ASSIGNOR TO BAIRD CORN HUSKER CO., A CORPORATION OF SOUTH DAKOTA.

CORN-HARVESTING MACHINE.

1,042,371.

Specification of Letters Patent. Patented Oct. 22, 1912.

Application filed October 27, 1910. Serial No. 589,298.

*To all whom it may concern:*

Be it known that I, WILLIAM SEWARD BAIRD, a citizen of the United States, residing at Urbana, in the county of Champaign and State of Illinois, have invented certain new and useful Improvements in Corn-Harvesting Machines or the Like, of which the following is a description.

My invention belongs to that general class of devices known as harvesting machines, and relates particularly to a mechanism for feeding the stalks of corn into the machine and for removing the ears of corn from the stalks of the standing corn and the trash from the ears.

My invention has among its objects the production of a more simple, efficient, durable and satisfactory device of the kind described, and particularly a device wherein the trash is removed from the ear, and the shelling of kernels from the cob avoided.

To this end my invention consists in the novel construction, arrangement and combination of parts herein shown and described and more particularly pointed out in the claims.

Referring to the drawings, wherein like reference characters indicate like or corresponding parts, Figure 1 is a top plan view of that part of a corn harvesting machine embodying my invention. Fig. 2 is a side elevation of the same. Fig. 3 is a sectional view taken substantially on line 3—3 of Fig. 1, and Fig. 4 is a sectional view taken substantially on line 4—4 of Fig. 3. Fig. 5 is an enlarged sectional view showing one of the pins or teeth in the roll.

Referring to the drawings, in which the entire harvesting machine is not shown, but only that part embodying the present invention and the parts necessary to illustrate the same, 1—1 is a portion of the frame of the machine, 2 one of the axles and 3 the wheels, Fig. 1 showing one wheel and Fig. 2 the opposite wheel.

The machine may be propelled in any desired manner, either by the use of horses or by suitable mechanical power not shown.

In the drawings mechanism is shown for only one row of corn, it being understood of course that additional mechanism may be provided so that two or more rows may be taken care of at the same time. Suitably carried on the frame 1 by brackets 6 and 7, or their equivalents, are a pair of snapping rolls 4 and 5, the same being preferably formed with one or more spiral grooves 9 extending longitudinally of the rolls in directions substantially as shown in the drawings. The rolls 4 and 5 are mounted proximate to each other so that the outer part 8 of the spiral of one roll fits into the corresponding groove 9 of the other roll, so that the rolls substantially engage. On the outer part 8 of the spirals are arranged pins 10 and in the grooves 9 are depressions 11, the pins and depressions being so arranged that the pins 10 on one roll mate with the depressions 11 on the other roll when the rolls are rotated. It might be noted that the pins 10 are each preferably beveled on the face approaching the opposite roll when the rolls are rotated, as most clearly shown in Fig. 5, so that they readily disengage from the stalks, since there are no sharp corners or points to hold the stalks on the rolls.

Rolls 4 and 5 may be driven in any suitable manner, preferably so that they rotate in opposite directions, as indicated in Fig. 3. The supporting shaft 13 of the roll 5 is shown extended and provided with a gear 14, which meshes with and drives the gear 15 on the extended supporting shaft 12 of the roll 4 (see Fig. 1). The shaft 13 may be driven in any suitable manner, as for example, from a combustion engine E, or its equivalent, through suitable shafting $13^2$ and sprocket chain connection $13^1$, or their equivalent. As the shaft 13 is driven the rolls 4 and 5 are rotated in opposite directions.

Suitably supported by the brackets 18, or the equivalents, and preferably extending transversely to the rolls 4 and 5, are a pair of trash rolls 16 and 17. These rolls may be formed substantially similar to the snapping rolls 4 and 5, that is spirally grooved as at 23—24, and provided with pins 25 and depressions 26. These rolls are also driven in opposite directions, and convenient means of driving the trash rolls comprises a bevel gear 19 on the shaft 13 and a bevel gear 20 on the shaft of one of the trash rolls, the opposite trash roll being driven through the gears 21 and 22 so that they rotate in opposite directions.

Mounted above the snapping rolls 4 and 5 and carried by the frame 1 in brackets 29 and 30, or their equivalents, are a pair of rolls or reels 28 arranged to feed the stalks in between the snapping rolls, the reels or rolls 28 being provided with one or more spirals 31 arranged thereon. The reels 28 are substantially similar, except that the spirals 31 extend in opposite directions. A simple mechanism for driving the reels consists in extending the shafts 32 and providing the same with bevel gears 33, which mesh with bevel gears 34 arranged on shafts 35. The shafts 35 are provided with bevel gears 36, which mesh with and are driven by bevel gears $37^1$, arranged on the shaft 37. The shaft 37 is provided with a sprocket wheel 38 and connected by a sprocket chain 39 with the sprocket wheel 40, secured to the axle of the machine.

Between the rolls 4 and 5 and the reels 28 are pick-up chain supports or platforms 42, which are supported by the frame of the machine, the same being preferably formed as at 46 to guide the stalks into the rolls 4 and 5. Above the supports 42 and between the reels 28 and the snapping reels 4 and 5, are arranged pick-up chains 43, each provided with prongs $43^1$. The pick-up chains are arranged on sprocket wheels 44 and 45, idlers $43^2$ maintaining the working sides parallel. The sprocket wheels 45 are driven from the shafts 35, so that as the shaft 37 is rotated, the pick-up chains are driven toward the trash rolls, the prongs $43^1$ engaging the stalks and carrying them along the rolls.

It is of course obvious that additional pick-up chains may be employed, if desired, similar to those described, below the rolls 4 and 5 (not shown).

It should be particularly noted that, in this construction, since the reels 28 and the pick-up chains 43 are driven from the axle, their speed, or the rate at which the stalks are fed between the snapping rolls, will depend upon the speed, or rate of travel of the harvesting machine and will vary with the speed, while, on the other hand, the snapping and trash rolls being driven by auxiliary power, their speed may be maintained constant.

While the reels and pick-up chains are shown as driven from the axle, which is of course driven by the wheels when the machine is propelled, I do not wish to be understood as limiting myself to this exact construction, as any other equivalent arrangement may be provided for driving the reels and pick-up chains at a rate of speed dependent upon the rate of travel of the machine along the rows of corn.

The operation of the machine may be briefly described as follows: As the corn harvester is drawn along the rows of corn, the rolls 28 and the pick-up chains 43 being driven from the axle at a rate of speed dependent upon the travel of the machine, the corn stalks are fed in between the reels and pick-up chains and carried between the snapping rolls 4 and 5. The rolls 4 and 5 remove the stalks from the ears, and any husks or trash not removed by the rolls 4 and 5 are taken up by the rolls 16 and 17 and removed from the ear. The ears are then deposited in any form of receptacle or conveyer (not shown), as illustrated for example in the patent issued to me for a corn husking machine, No. 892,208, dated June 30, 1908. The stalks and trash removed by the rolls are drawn through and discharged.

Having thus described my invention, it is obvious that various immaterial modifications may be made in same without departing from the spirit of my invention; hence I do not wish to be understood as limiting myself to the exact form, arrangement, construction or combination of parts herein shown and described, or uses mentioned.

What I claim as new, and desire to secure by Letters Patent, is:—

1. In a device of the character described, a pair of substantially parallel snapping rolls provided with inter-engaging spirally disposed ribs and grooves, one of said rolls being provided with a plurality of pins projecting therefrom, and the other of said rolls with a plurality of depressions adapted to receive said pins upon rotation of the rolls, the front faces of said pins being beveled, and means for rotating said rolls in opposite directions.

2. In a device of the character described, a pair of longitudinally extending snapping rolls, and a pair of trash rolls positioned adjacent the rear ends of said snapping rolls, and extending upwardly from the snapping rolls and at an angle thereto, the longitudinal axes of the trash rolls being positioned in substantially the same vertical plane as the longitudinal axes of the snapping rolls and extending transversely thereof.

3. In a device of the character described, a pair of longitudinally extending snapping rolls, a pair of trash rolls positioned adjacent the rear ends of said snapping rolls and extending upwardly at right angles thereto, the longitudinal axes of the trash rolls being positioned in substantially the same vertical plane as the longitudinal axes of the snapping rolls, and feeding means positioned above said snapping rolls for directing the material between the snapping rolls and toward the trash rolls.

4. In a device of the character described, a pair of longitudinally extending snapping rolls, a pair of trash rolls positioned adjacent the rear ends of said snapping rolls and extending upwardly from the snapping rolls and at an angle thereto, the longitudinal axes of the trash rolls being positioned in substantially the same vertical plane as the longitudinal axes of the snapping rolls and extending transversely thereof, a pair of pick-up chains mounted above said snapping rolls and provided with stalk engaging members extending over said rolls, and means for driving said chains to move said stalk engaging members longitudinally of said snapping rolls and toward said trash rolls.

5. In a corn harvesting machine, a pair of longitudinally extending snapping rolls, a pair of trash rolls positioned adjacent the rear ends of said snapping rolls and extending upwardly from the snapping rolls and at an angle thereto, the longitudinal axes of the trash rolls being positioned in substantially the same vertical plane as the longitudinal axes of the snapping rolls and extending transversely thereof, means for feeding the stalks into said snapping rolls and toward said trash rolls, means for driving said feeding means from the axle of the harvesting machine, and independent means for rotating said snapping and trash rolls in opposite directions.

6. In a corn harvesting machine, snapping mechanism, and a pair of engaging trash rolls arranged proximate to said snapping mechanism and extending upwardly therefrom at substantially right angles thereto, said trash rolls each being provided with a groove extending spirally thereof, the grooves in the rolls extending in opposite directions, and means for rotating said rolls.

7. In a corn harvesting machine, a pair of substantially parallel spirally grooved rolls, a pair of similarly formed trash rolls mounted above and extending upwardly from said first mentioned rolls at an angle thereto, the longitudinal axes of the trash rolls being positioned in substantially the same vertical planes as the longitudinal axes of the first mentioned pair of rolls and extending transversely thereof, and means for rotating the rolls of each pair in opposite directions.

8. In a device of the kind described and in combination, a pair of substantially parallel engaging snapping rolls, a pair of substantially parallel engaging trash rolls extending substantially transversely to said snapping rolls, a pair of reels mounted above said snapping rolls and a pair of movable pick-up chains mounted between said reels and said snapping rolls, means connected with the vehicle axle for rotating said reels and driving said chains in opposite directions and means independent of said reels and chain driving mechanism for rotating said snapping and trash rolls in opposite directions.

9. In a corn harvesting machine, a pair of snapping rolls spirally grooved in opposite directions, means for rotating said rolls in opposite directions, a pair of trash rolls spirally grooved in opposite directions positioned above said snapping rolls and extending upwardly at an angle therefrom, the longitudinal axes of said trash rolls being positioned in substantially the same vertical planes as the longitudinal axes of the snapping rolls and extending transversely thereof, means for driving said trash rolls in opposite directions, a pair of spiral reels mounted above said snapping rolls, a pair of take up chains provided with stalk engaging means thereon, said chains being movable toward said trash rolls, and means coöperating with the machine axle for rotating said rolls and driving said chains.

10. In a corn harvesting machine, a pair of substantially parallel snapping rolls spirally grooved in opposite directions, one of said rolls being provided with pins extending therefrom, and the other of said rolls with depressions adapted to receive said pins, a pair of spirally grooved trash rolls mounted above said snapping rolls, the longitudinal axes of said trash rolls being positioned in substantially the same vertical planes as the longitudinal axes of the snapping rolls and extending at substantially right angles thereto, means for driving the rolls of each pair in opposite directions, a pair of spirally formed reels, a pair of take-up chains mounted proximate said snapping rolls, each of said chains being provided with stalk engaging means extending over said snapping rolls, means for driving said chains and means coöperating with the vehicle axle for rotating said reels.

11. In a corn harvesting machine, a pair of spirally grooved inter-engaging snapping rolls, a pair of similarly formed inter-engaging trash rolls supported above said snapping rolls, the longitudinal axes of said trash rolls being positioned in substantially the same vertical planes as the longitudinal axes of the snapping rolls, and extending at substantially right angles thereto, supporting means for said snapping and trash rolls, means for driving said rolls, a pair of spiral reels mounted above and adjacent the forward portion of said snapping rolls, a pair of chains mounted above said snapping rolls and provided with prongs extending over said rolls, means for driving said chains to move said prongs longitudinally of said snapping rolls and toward said trash rolls, and means for rotating said reels in opposite directions, said chain and reel driving mechanism being dependent upon the travel of the machine.

In testimony whereof, I have hereunto signed my name in the presence of two subscribing witnesses.

WILLIAM SEWARD BAIRD.

Witnesses:
 WM. H. MURPHY,
 LOUIS LANUM.